UNITED STATES PATENT OFFICE.

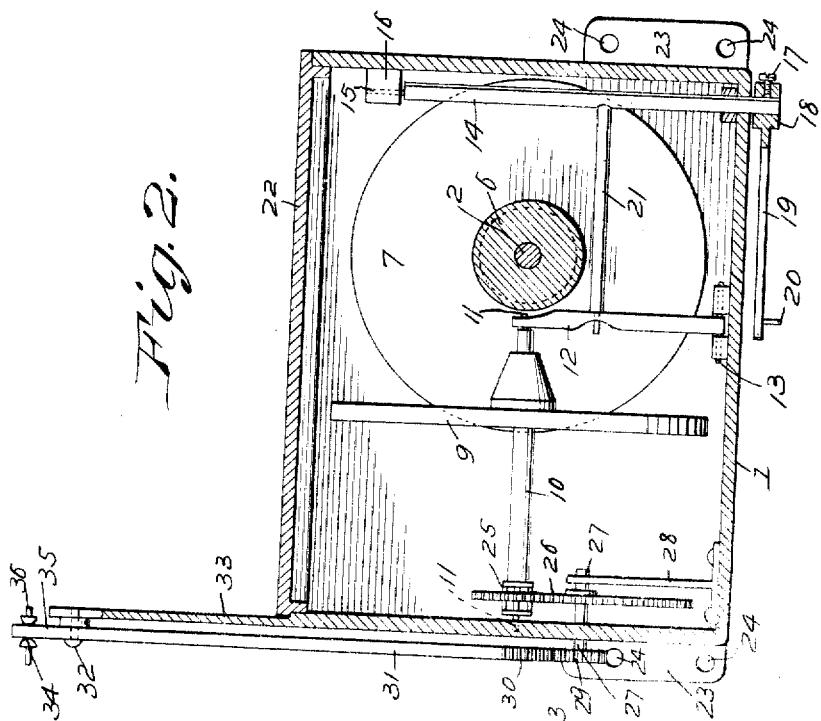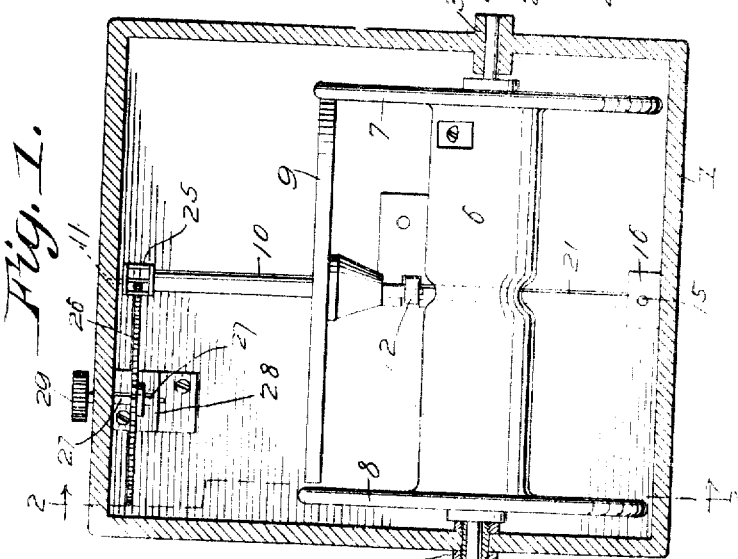

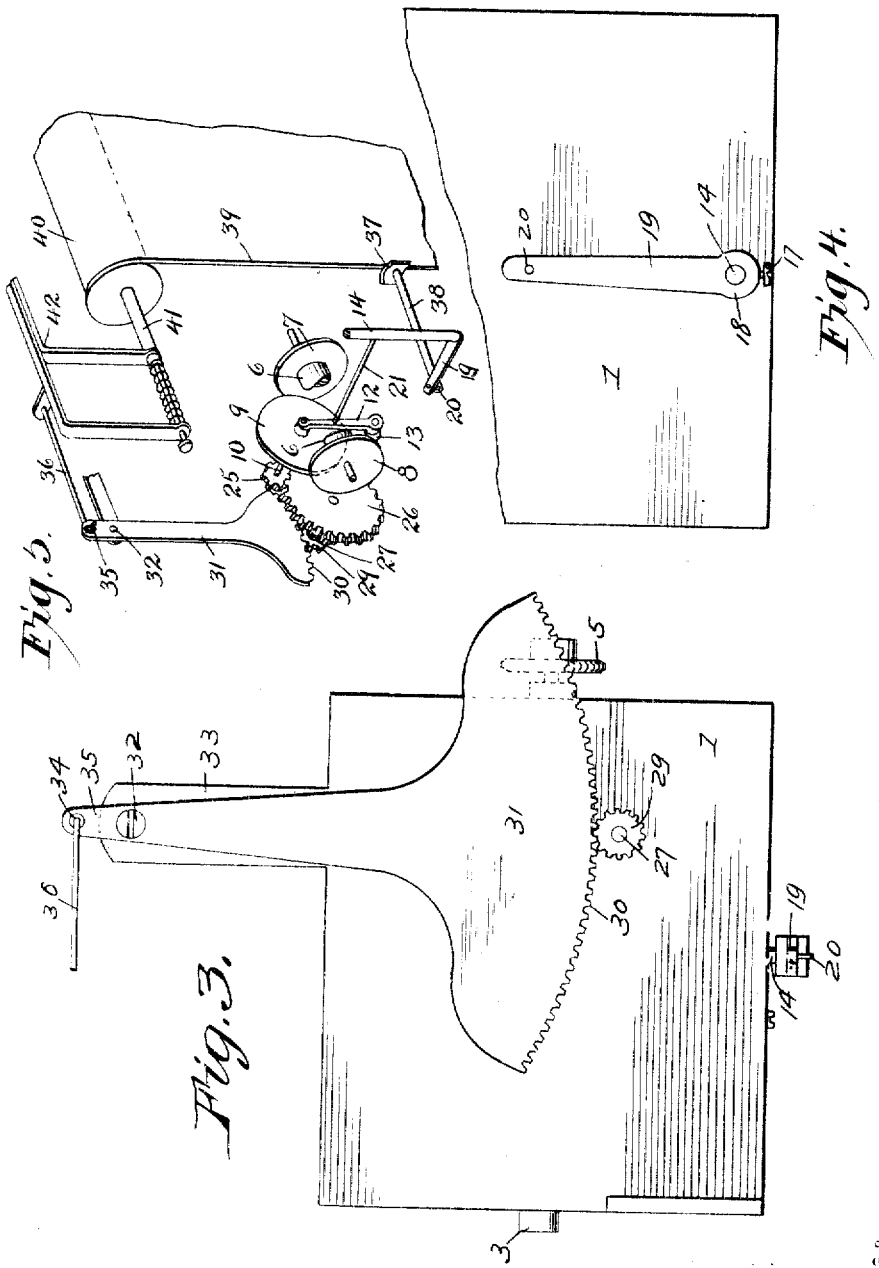

GEORGE P. BRAND, OF NEW YORK, N. Y.

MECHANICAL MOVEMENT.

1,210,037. Specification of Letters Patent. Patented Dec. 26, 1916.

Application filed July 19, 1915. Serial No. 40,624.

*To all whom it may concern:*

Be it known that I, GEORGE P. BRAND, a citizen of the United States, residing at New York, in the county of New York and State of New York, have invented certain new and useful Improvements in Mechanical Movements, of which the following is a specification.

This invention relates to certain new and useful improvements in mechanical movements capable of use in many arts and instances where mechanism of a very sensitive nature is required for controlling any member or for automatic reversal of any part.

The present improvement is applicable for use in steering vessels, submarines or the like; for guiding a web of paper or the like and controlling its lateral deviations; and, in fact, applicable for many uses for maintaining a constant course or for keeping a vessel or other object upon a level or upon a course at any predetermined angle of inclination.

The present invention has for its objects among others to provide a simple and efficient, most sensitive device of this nature readily applied to any of the purposes for which it may be adapted and which in use shall be reliable, positive in its action, composed of few parts and those readily assembled, as well as easily accessible for inspection or repairs.

Other objects and advantages of the invention will hereinafter appear and the novel features thereof will be particularly pointed out in the appended claims.

The invention is clearly illustrated in the accompanying drawings, which, with the numerals of reference marked thereon, form a part of this specification, and in which—

Figure 1 is a horizontal section through the casing containing the mechanism, the latter being shown in plan. Fig. 2 is a section on the line 2—2 of Fig. 1, looking in the direction of the arrows. Fig. 3 is a rear view of the casing and its oscillating sector. Fig. 4 is a bottom plan of a portion of the casing containing the mechanism. Fig. 5 is a diagrammatic view showing one application of the invention.

Like numerals of reference indicate like parts throughout the several views.

Referring to the drawings, 1 designates a casing designed to be affixed in any suitable position according to the use to which the mechanism is to be put and within this casing I dispose the operating mechanism now to be described.

2 is a shaft mounted in suitable bearings 3—3 in opposite walls of the casing, one end being extended, as seen at 4, and provided with the sprocket wheel 5, or it may be a gear or other member, as may be found most expedient. On this shaft is the enlarged hub 6 serving to connect the two friction wheels 7 and 8 and to insure sufficient stability.

9 is a friction wheel carried by the shaft 10, which shaft is mounted on exceedingly small pintles 11, as seen in Fig. 2, so as to reduce to a minimum the friction and allow the wheel to revolve with the greatest freedom. In practice, I employ pintles about the size of a 56 drill. These pintles are mounted in bearings, the one pintle in the wall of the casing 1 and the other in the support 12 rising from the bottom of the casing, the lower end thereof being mounted upon a suitable pivot 13, as shown in Figs. 1 and 2, to allow of the movement of the support 12 necessary for it to permit of the requisite movement of the friction wheel 9. This wheel, as seen clearly in Fig. 1, is disposed between the two friction wheels 7 and 8, the periphery of the said wheel 9 being designed to contact with either one or the other of said wheels 7 and 8, as the case may be, under conditions which will soon be made clear. In practice, the amount of play or space between the periphery of the wheel 9 and the adjacent face of either of the wheels 7 and 8 will be substantially two one-thousandths of an inch or less, being just sufficient to permit of the slightest degree of movement of the wheel 9 out of contact with either of the wheels 7 or 8 without contacting with the other of said wheels.

14 is a vertical shaft within the casing 1, having its upper end provided with a pintle or the like 15 mounted to turn freely within a suitable bearing or the like 16 fixed to the inner face of the casing, as seen clearly in Fig. 2. The lower end of this shaft 14 is shown as extended through the bottom wall of the casing and has secured thereto by suitable means, as, for instance, a screw 17, the enlarged portion 18 of a lever 19 which, in the present instance, is shown as provided with a pin or projection 20 for a purpose soon to be described.

The vertical shaft 14 has rigidly secured thereto the horizontal arm 21, as seen best in Fig. 2, the inner end of which is connected with the vibratory support 12. The connection between the members 21 and 12 is such that while it prevents lost motion, it permits of the necessary vibratory movement of the parts without offering resistance. It will be understood that while some little movement is necessary to permit of the requisite vibration, this movement is slight for, as above stated, the wheel 9 is limited in its movements to the two one-thousandths of an inch or less.

The cover 22 is made readily removable for access to the parts, as seen in Fig. 2. It is to be understood, however, that the present invention is not restricted to the particular form of casing and closure herein disclosed, but may be employed in connection with any other form of casing or the casing may sometimes be entirely omitted. In the present instance the casing is shown as provided with lugs or extensions 23 with holes 24 for the reception of screws or the like whereby it may be affixed in any desired position. On the outer end of the shaft 10 is a gear 25 of any suitable character which is adapted to mesh with a large gear 26 carried by a shaft 27 mounted in bearings in the end wall of the casing and in an upright 28 secured to the bottom of said casing, as seen in Fig. 2. The outer end of this shaft is extended through the casing and carries a small gear 29 which meshes with the teeth 30 of a sector 31 fulcrumed at 32 on a suitable upright or the like 33 rising from the casing 1, as seen in Figs. 2 and 3. Pivotally connected, as at 34, with the short arm 35 of this sector above its pivot is a rod 36, see Figs. 2 and 3, which may be extended for connection with any suitable part which it is desired to control by the oscillation of the sector.

To the pin 20 may be connected any suitable member, the movement of which in one direction or the other controls the movement of the wheel 9, and this movement of the wheel 9 throws the same out of contact with the one wheel 7 or 8 and into contact with the other and, consequently, reverses the rotation of the parts. The mechanism is so constructed and so delicate in its action that the slightest movement of the lever 19 is all that is required to change the direction of oscillation of the sector 31. It is to be remembered that this lever 19, as well as the wheel 9, has only the very slight movement above referred to, namely the two one-thousandths of an inch. When the wheel 9 is in contact with the wheel 7, the sector moves in one direction; when the wheel 9 is in contact with the wheel 8, the sector moves in the opposite direction. When the parts are in neutral position, the sector remains central and the wheel 9 does not revolve, thereby being out of contact with both of the wheels 7 and 8. This neutral position, however, is of short duration. When the wheel 9 is revolving, no matter in which direction, the sector oscillates in one direction or the other, and through its connection by means of the rod 26 with the member which it is desired to control, the latter is moved in the one direction or the other, thus tending to at all times keep such part in perfect central position. It is to be understood that the shaft 2 and the two friction wheels 7 and 8 carried thereby are constantly revolving by suitable connection with the shaft, either through the medium of the sprocket wheel 5 and sprocket chain, not shown, or in any other suitable way.

I have found the device as above described eminently efficient in automatic piano players, and in such application the lever 19 is designed to be connected, in any suitable manner, as by the arm 38, with a movably mounted edge guide or the like 37, which latter is moved automatically by contact therewith of the edge of a note sheet in its lateral deviations, there being a suitable connection between the member 36 and any suitable form of transmission mechanism 42 adapted to control the endwise movement of a music spool 40 carried by the spindle 41 and carrying a perforated sheet 39. The least deviation of the note sheet actuates the lever 19 and this, in turn, controls the friction wheel 9 and moves it one way or the other into contact with the wheel 7 or 8 and the movement of the sector thereby causes the endwise movement of the music spool. The entire mechanism is automatically actuated by reason of the lateral deviation of the note sheet.

It is to be noted that the sector has a pendulous movement, being pivoted near its upper end and the preponderance of weight being at the lower end. It is most sensitive in its movements and during the operation of the device is practically continuously in motion, oscillating back and forth.

Modifications in details may be resorted to without departing from the spirit of the invention or sacrificing any of its advantages.

What is claimed as new is:—

1. A mechanical movement embodying an oscillatory web-actuated member, a roll-actuating member, and an interposed friction mechanism and control device embodying an oscillatory member.

2. An oscillatory web-actuated member, a roll-actuating member, and an interposed friction mechanism and control device embodying a pendulous oscillatory member.

3. A mechanical movement embodying an oscillatory web-actuated member, a roll-actuating member, and an interposed automatically reversible friction mechanism with one of its members oscillatorily mounted, and an oscillatory control mechanism actuated by the automatic oscillation of one of the members of said friction mechanism.

4. A mechanical movement embodying an oscillatorily mounted member, gearing co-operating therewith and a friction reverse mechanism one member of which is oscillatorily mounted and operatively connected with said gearing and actuating said first-named member.

5. A mechanical movement embodying an oscillatorily mounted member, gearing co-operating therewith, a friction reverse mechanism one member of which is operatively connected with said gearing and a web-controlled oscillatory support for said last-named member.

6. A mechanical movement embodying an oscillatorily mounted member, gearing co-operating therewith, a friction reverse mechanism one member of which is operatively connected with said gearing, an oscillatory support for said last-named member, and a controlling lever connected with said support.

7. A mechanical movement embodying an oscillatorily mounted member, gearing co-operating therewith, an automatically reversible friction mechanism one member of which is oscillatorily mounted and connected with said gearing and actuating said first-named member, and a controlling lever operatively connected with the support of said member.

8. In a mechanical movement, automatically reversible friction mechanism, an oscillatory support for one member thereof, a controlling lever operatively connected with said support and automatically actuated, an oscillatory sector, gearing interposed between the same and the shaft of the oscillatorily mounted member of the friction mechanism, and a controlling member connected with said sector.

9. In a mechanical movement, a constantly revoluble shaft carrying friction wheels, a friction wheel disposed between said wheels, automatic means for moving said friction wheel into contact with one or the other of the first-named wheels, and an oscillatory control mechanism governed by the shiftable friction wheel.

10. A mechanical movement embodying constantly revoluble friction wheels, a shiftable friction wheel for contact with one or the other of the first-named wheels, automatic means for shifting the shiftable wheel and a control mechanism operatively connected therewith.

11. A mechanical movement embodying constantly revoluble friction wheels, a shiftable friction wheel for contact with one or the other of the first-named wheels, automatic means for shifting the shiftable wheel and a control mechanism operatively connected therewith and embodying an oscillatory sector.

12. A mechanical movement embodying constantly revoluble friction wheels, a shiftable friction wheel for contact with one or the other of the first-named wheels, automatic means for shifting the shiftable wheel, a control mechanism operatively connected therewith and embodying an oscillatory sector and interposed spur gearing.

13. A mechanical movement embodying constantly revoluble friction wheels, a shiftable friction wheel for contact with one or the other of the first-named wheels, automatic means for shifting the shiftable wheel and a control mechanism operatively connected therewith and embodying an oscillatory sector and a controlling member connected with said sector.

14. A mechanical movement embodying constantly revoluble friction wheels, a shiftable friction wheel for contact with one or the other of the first-named wheels, automatic means for shifting the shiftable wheel, a control mechanism operatively connected therewith and embodying an oscillatory sector, interposed spur gearing and a controlling member connected with said sector.

15. A mechanical movement embodying constantly revoluble friction wheels, a shiftable friction wheel for contact with one or the other of the first-named wheels, a web-actuated member, a roll-actuating member, and a control mechanism interposed between said friction wheels and the roll-actuating member.

16. A mechanical movement embodying constantly revoluble friction wheels, a shiftable friction wheel for contact with one or the other of the first-named wheels, a web-actuated member, a roll-actuating member, and a control mechanism interposed between said friction wheels and the roll-actuating member and embodying a pendulously oscillatory member operatively connected with the friction mechanism.